United States Patent
Tsukada

(10) Patent No.: US 12,192,642 B2
(45) Date of Patent: Jan. 7, 2025

(54) INFORMATION PROCESSING SYSTEM, INFORMATION PROCESSING APPARATUS, INFORMATION PROCESSING METHOD AND RECORDING MEDIUM

(71) Applicant: NEC Corporation, Tokyo (JP)

(72) Inventor: Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/775,969

(22) PCT Filed: Sep. 30, 2021

(86) PCT No.: PCT/JP2021/036237
§ 371 (c)(1),
(2) Date: May 11, 2022

(87) PCT Pub. No.: WO2023/053383
PCT Pub. Date: Apr. 6, 2023

(65) Prior Publication Data
US 2024/0155244 A1  May 9, 2024

(51) Int. Cl.
*H04N 23/71* (2023.01)
*G06T 7/20* (2017.01)
(Continued)

(52) U.S. Cl.
CPC ............... *H04N 23/71* (2023.01); *G06T 7/20* (2013.01); *G06T 7/90* (2017.01); *H04N 23/72* (2023.01);
(Continued)

(58) Field of Classification Search
CPC ........ H04N 23/71; H04N 23/72; H04N 23/73; H04N 23/74; G06T 7/20; G06T 7/90; G06T 2207/10024; G06T 2207/30196
See application file for complete search history.

(56) References Cited

U.S. PATENT DOCUMENTS

| | | | |
|---|---|---|---|
| 2008/0055476 A1* | 3/2008 | Shehata | H04N 9/643 348/E9.04 |
| 2008/0117305 A1* | 5/2008 | Rogers | G03B 7/08 348/222.1 |

(Continued)

FOREIGN PATENT DOCUMENTS

| | | | |
|---|---|---|---|
| JP | 2005094133 A | * | 4/2005 |
| JP | 2008-187318 A | | 8/2008 |

(Continued)

OTHER PUBLICATIONS

International Search Report for PCT Application No. PCT/JP2021/036237, mailed on Dec. 28, 2021.

*Primary Examiner* — Ahmed A Berhan

(57) ABSTRACT

An information processing system (10) comprises: an acquiring means (110) for acquiring skin color information which is information relating to skin color of a target; an estimating means (120) for estimating luminance information of skin of the target on the basis of the skin color information; and a control means (130) for controlling at least one of camera parameter relating to exposure and illumination (19) when imaging the target on the basis of the luminance information. According to such the information processing system, it is possible to image a target with an appropriate condition.

11 Claims, 16 Drawing Sheets

(51) Int. Cl.
*G06T 7/90* (2017.01)
*H04N 23/72* (2023.01)
*H04N 23/73* (2023.01)
*H04N 23/74* (2023.01)

(52) U.S. Cl.
CPC ............. *H04N 23/73* (2023.01); *H04N 23/74* (2023.01); *G06T 2207/10024* (2013.01); *G06T 2207/30196* (2013.01)

(56) References Cited

U.S. PATENT DOCUMENTS

| | | |
|---|---|---|
| 2015/0238087 A1 | 8/2015 | Yamashita et al. |
| 2015/0373282 A1 | 12/2015 | Ishii |
| 2016/0125178 A1 | 5/2016 | Danikhno et al. |
| 2024/0048672 A1* | 2/2024 | Jung .......................... G06T 7/20 |

FOREIGN PATENT DOCUMENTS

| | | |
|---|---|---|
| JP | 2010-183459 A | 8/2010 |
| JP | 2016-009998 A | 1/2016 |
| JP | 2017-537386 A | 12/2017 |
| WO | 2014/073646 A1 | 5/2014 |
| WO | 2021/044540 A1 | 3/2021 |

* cited by examiner

FIG. 16

|  | Exposure time (Shutter speed) | Illumination |
|---|---|---|
| First control | Shorten | Brighten |
| Second control | Prolong | Darken | ized
INFORMATION PROCESSING SYSTEM, INFORMATION PROCESSING APPARATUS, INFORMATION PROCESSING METHOD AND RECORDING MEDIUM This application is a National Stage Entry of PCT/JP2021/036237 filed on Sep. 30, 2021, the contents of all of which are incorporated herein by reference, in their entirety.

TECHNICAL FIELD

This disclosure relates to technical fields of an information processing system, an information processing apparatus, an information processing method and a recording medium.

BACKGROUND ART

As a system of this type, a system, which adjusts exposure and light environment when a living body is imaged, is known. For example, Patent Literature 1 discloses that a technique for determining amount of light of illumination on the basis of a relationship between illuminance and a pupil size. Patent Literature 2 discloses a technique for setting exposure time when imaging an iris image.

As another related technique, for example, Patent Literature 3 discloses a technique for acquiring luminance information of a skin area around a pupil area by detecting the pupil area.

Cited List

Patent Literature

Patent Literature 1: International Publication No. 2021/044540

Patent Literature 2: Japanese Patent Application Laid Open No. 2017-537386

Patent Literature 3: International Publication No. 2014/073645

SUMMARY

Technical Problem

This disclosure aims to improve techniques disclosed in prior art literatures.

Solution to Problem

One aspect of an information processing system of this disclosure comprises: an acquiring means for acquiring skin color information which is information relating to skin color of a target; an estimating means for estimating luminance information of skin of the target on the basis of the skin color information; and a control means for controlling at least one of camera parameter relating to exposure and illumination when imaging the target on the basis of the luminance information.

One aspect of an information processing apparatus of this disclosure comprises: an acquiring means for acquiring skin color information which is information relating to skin color of a target; an estimating means for estimating luminance information of skin of the target on the basis of the skin color information; and a controlling means for controlling at least one of camera parameter relating to exposure and illumination when imaging the target on the basis of the luminance information.

One aspect of an information processing method of this disclosure is executed by at least one computer, wherein the information processing method comprises: acquiring skin color information which is information relating to a skin color of a target, estimating luminance information of the skin of the target on the basis of the skin color information, and controlling at least one of a camera parameter relating to exposure and illumination when imaging the target on the basis of the luminance information.

One aspect of a recording medium of this disclosure records a computer program for causing at least one computer to execute an information processing method, the information processing method comprising: acquiring skin color information which is information relating to skin color of a target, estimating luminance information of skin of the target on the basis of the skin color information, and controlling at least one of a camera parameter relating to exposure and illumination when imaging the target on the basis of the luminance information.

BRIEF DESCRIPTION OF DRAWINGS

FIG. 16 is a table showing an example of a control operation by an information processing system according to a ninth embodiment.

DESCRIPTION OF EMBODIMENT

Hereinafter, embodiments of information processing systems, information processing apparatuses, information processing methods, and recording media will be described with reference to drawings.

FIRST EMBODIMENT

An information processing system according to a first embodiment will be described with reference to FIGS. 1 to 3.
(Hardware Configuration)

First, a hardware configuration of the information processing system according to the first embodiment will be described with reference to FIG. 1. FIG. 1 is a block diagram showing the hardware configuration of the information processing system according to the first embodiment.

Figure 1:
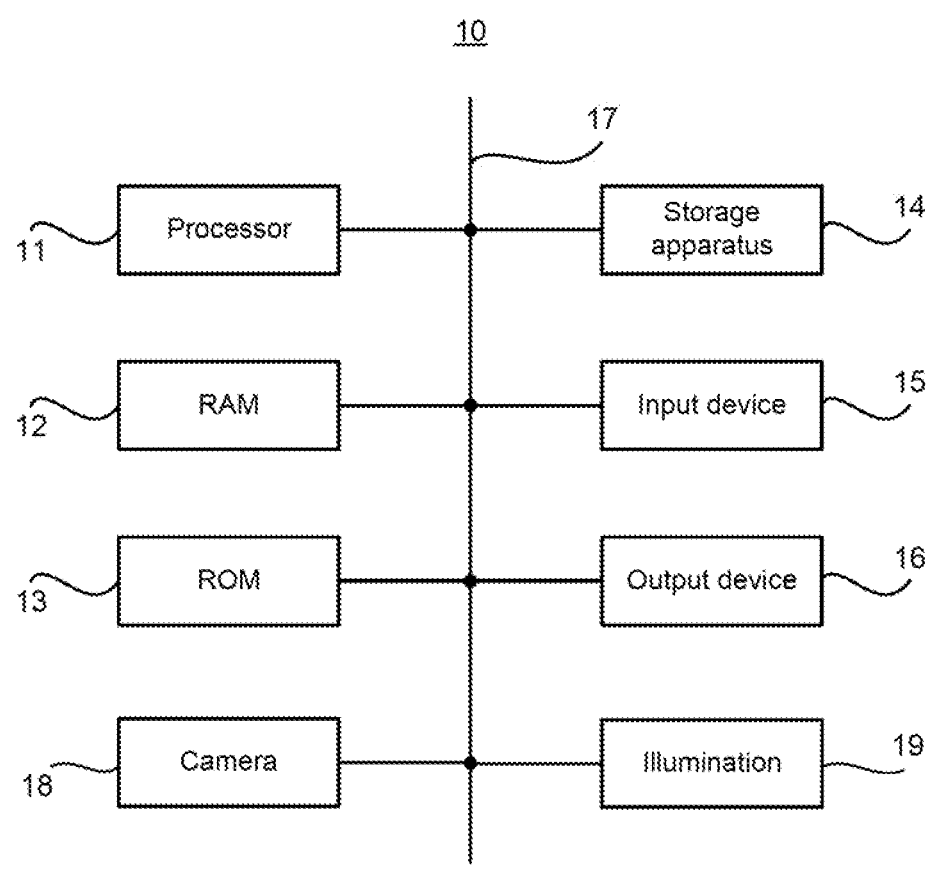
FIG. 1 is a block diagram showing a hardware configuration of an information processing system according to a first embodiment.

As shown in FIG. 1, the information processing system 10 according to the first embodiment includes a processor 11, a RAM (Random Access Memory) 12, a ROM (Read Only Memory) 13, and a storage apparatus 14. The information processing system 10 may further include an input device 15 and an output device 16. The information processing system 10 may also include a camera 18 and an illumination 19. The processor 11, the RAM 12, the ROM 13, the storage apparatus 14, the input device 15, the output device 16, the camera 18 and the illumination 19 described above are connected via a data bus 17.

The processor 11 reads computer programs. For example, the processor 11 is configured to read a computer program stored in at least one of the RAM 12, the ROM 13 and the storage apparatus 14. Alternatively, the processor 11 may read a computer program stored in a computer-readable recording medium using a recording medium reading apparatus (not shown). The processor 11 may acquire (i.e., read) a computer program from an apparatus (not shown) located outside the information processing system 10 via a network interface. The processor 11 controls the RAM 12, the storage apparatus 14, the input device 15, and the output device 16 by executing the read computer program. In particular, in the present embodiment, when the computer program read by the processor 11 is executed, a function block for executing control for imaging a target is implemented in the processor 11. That is, the processor 11 may function as a controller that executes each control in the information processing system 10.

The processor 11 may be configured as, for example, a CPU (Central Processing Unit), a GPU (Graphics Processing Unit), an FPGA (field-programmable gate array), a DSP (Demand-Side Platform), and an ASIC (Application Specific Integrated Circuit). The processor 11 may be configured in one of these, or may be configured to use a plurality in parallel.

The RAM 12 temporarily stores computer programs executed by the processor 11. The RAM 12 temporarily stores data for use by the processor 11 when the processor 11 is executing a computer program. The RAM 12 may be, for example, a D-RAM (Dynamic RAM).

The ROM 13 stores computer programs executed by the processor 11. The ROM 13 may otherwise store fixed data. The ROM 13 may be, for example, a P-ROM (Programmable ROM).

The storage apparatus 14 stores data that the information processing system 10 stores for a long period of time. The storage apparatus 14 may operate as a temporary storage apparatus of the processor 11. The storage apparatus 14 may include, for example, at least one of a hard disk apparatus, a magneto-optical disk apparatus, an SSD (Solid State Drive), and a disk array apparatus.

The input device 15 is a device that receives input instructions from a user of the information processing system 10. The input device 15 may include, for example, at least one of a keyboard, a mouse, and a touch panel. The input device 15 may be configured as a portable terminal, such as a smartphone or tablet.

The output device 16 is a device for outputting information relating to the information processing system 10 to the outside. For example, the output device 16 may be a display apparatus (e.g., a display) capable of displaying information about the information processing system 10. The output device 16 may be a speaker or the like capable of outputting audio information relating to the information processing system 10. The output device 16 may be configured as a portable terminal, such as a smartphone or tablet.

The camera 18 is a camera installed at a position capable of imaging an image of a target (for example, an image including a face of the target or an image including an iris of the target). Incidentally, the target here is not limited to human, may include animals such as dogs and snakes, a robot or the like. The camera 18 may be a camera mounted on a terminal (e.g., a smartphone) which is had by the target. The camera 18 may be a camera for capturing a still image or a camera for capturing a video. The camera 18 may be configured as a visible light camera or as a near infrared camera. A plurality of cameras 18 may be provided. If the plurality of cameras 18 are provided, cameras 18 may be provided as different types of cameras. For example, a visible light camera for imaging a face of the target and a near-infrared camera for imaging the iris of the target may be provided. The camera 18 may also be provided as a depth camera or a thermal camera.

Irradiation 19 is configured to be able to irradiate illumination light to the target when imaging an image by the camera 18. For example, if a visible light camera is provided as the camera 18, the illumination 19 may be configured to irradiate visible light. Further, when the near-infrared camera is provided as the camera 18, the illumination 19 may be configured to irradiate near-infrared light. The illumination 19 may be provided with a plurality. If the illumination 19 is provided a plurality, illuminations 19 may be provided as different types of illuminations.

In FIG. 1, an example of the information processing system 10 configured to include a plurality of apparatuses/ devices has been exemplified, but all or a part of these functions may be realized by one apparatus (information processing apparatus). The information processing apparatus may be configured with, for example, only the processor 11, the RAM 12, and the ROM 13 described above, and an external apparatus connected to, for example, the information processing apparatus for other components (i.e., the storage apparatus 14, the input device 15, the output device 16, the camera 18). In addition, the information processing apparatus may realize some arithmetic functions by an external apparatus (e.g., external servers, clouds, etc.).
(Functional Configuration)

Next, a functional configuration of the information processing system 10 according to the first embodiment will be described with reference to FIG. 2. FIG. 2 is a block diagram showing a functional configuration of the information processing system according to the first embodiment.

Figure 2:
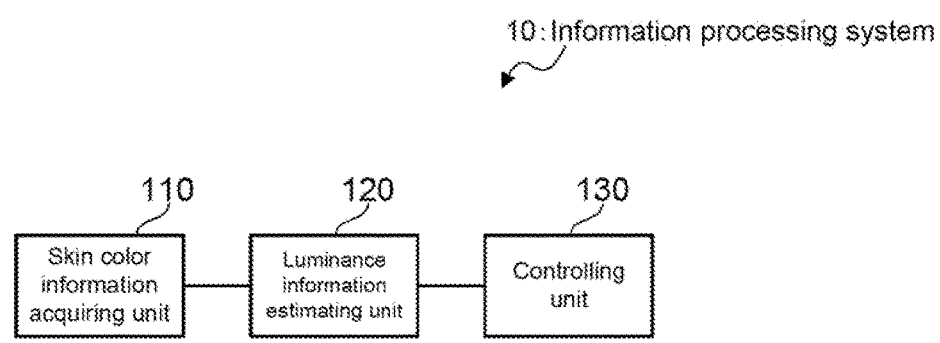
FIG. 2 is a block diagram showing a functional configuration of the information processing system according to the first embodiment.

As shown in FIG. 2, the information processing system 10 according to the first embodiment is configured to include, as components for realizing its functions, a skin color information acquiring unit 110, a luminance information estimating unit 120, and a controlling unit 130. Each of the skin color information acquiring unit 110, the luminance information estimating unit 120, and the controlling unit 130 may be a processing block realized by the above-described processor 11 (see FIG. 1), for example.

The skin color information acquiring unit 110 is configured to be capable of acquiring skin color information relating to the skin color of the target (i.e., the imaging target by the camera 18). The skin color information acquiring unit 110 may acquire the skin color information from the target image. For example, the skin color information acquisition unit 110 may acquire the skin color information from a face of the target included in a visible light image. In this case, the skin color information acquiring unit 110 may have a function of detecting an area (that is, a facial area) in which the face of the target is present. Further, the skin color information acquiring unit 110 may detect an area of a part of the face of the target and acquire the skin color information of area. For example, the skin color information acquiring unit 110 may detect a cheek area or a forehead area of the target to acquire the skin color information. In this way, it is possible to prevent the color of a hair portion and a mouth portion of the target from being erroneously detected. Further, the skin color information acquiring unit 110 may detect an eye and acquire the skin color information from a skin area around the eye. The skin color information may be acquired, for example, as an RGB value. The skin color information may be acquired as the mean RGB value of a predetermined area of interest (e.g., facial area). It is configured that the skin color information acquired by the skin color information acquiring unit 110 is output to the luminance information estimating unit 120.

The luminance information estimating unit 120 is configured to be able to estimate luminance information of the skin of the target (e.g., luminance information of the skin when imaging the target) from the skin color information acquired by the skin color information acquiring unit 110. That is, the luminance information estimating unit 120 is configured to estimate the luminance information when it is assumed to perform imaging in time to come, without imaging the actual target. The luminance information may be, for example, information including a pixel value or a luminance value. The luminance information may be, for example, luminance information in the case of imaging with a visible light camera, may be luminance information in the case of imaging with a near-infrared camera. A specific method for estimating luminance information from the skin color information will be described in detail in another embodiment to be described later. It is configured that the luminance information estimated by the luminance information estimating unit 120 is output to the controlling unit 130.

The controlling unit 130 is configured to control a camera parameter relating to exposure when imaging the target on the basis of the luminance information estimated by the luminance information estimating unit 120. The camera parameter may include, for example, at least one of aperture, exposure time, and gain of a lens. The controlling unit 130 may control one type of camera parameter, or may control a plurality of types of camera parameters. The controlling unit 130 should control the camera parameter so that the luminance information of the target is an appropriate value when imaging by the camera 18 on the basis of the estimated luminance information. For example, the controlling unit 130 may control the camera parameter so that the luminance information is reduced, if the estimated luminance information is too large (i.e., if too bright). For example, the controlling unit 130 may reduce the aperture value, shorten the exposure time, or reduce the gain. Alternatively, the controlling unit 130 may control the camera parameter so that the luminance information is increased, if the estimated luminance information is too small (i.e., if too dark). For example, the controlling unit 130 may increase the aperture value, increase the exposure time, or increase the gain.

(Flow of Operation)

Next, flow of operation by the information processing system 10 according to the first embodiment will be described referring to FIG. 3. FIG. 3 is a flowchart showing the flow of the operation by the information processing system according to the first embodiment.

Figure 3:
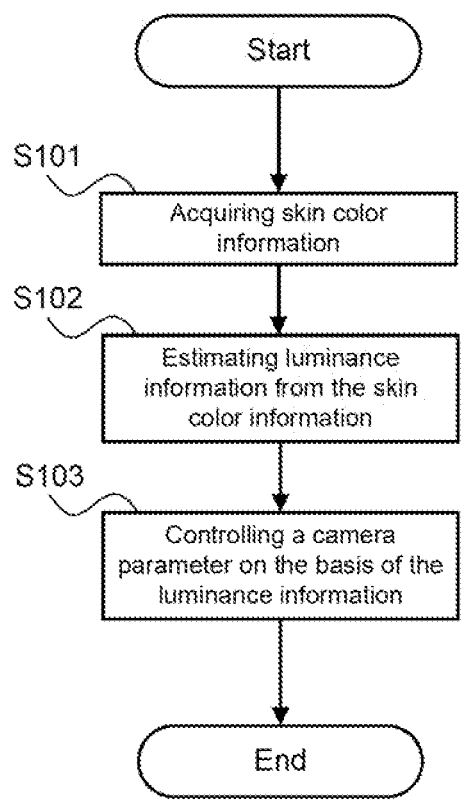
FIG. 3 is a flowchart showing flow of operation by the information processing system according to the first embodiment.

As shown in FIG. 3, when the information processing system 10 according to the first embodiment operates, first, the skin color information acquiring unit 110 acquires the skin color information of the target (step S101). Incidentally, when the skin color information acquiring unit 110 acquires the skin color information from the image of the target, a processing for capturing an image of the target (e.g., a processing for capturing a face image of the target) may be executed before this step.

Subsequently, the luminance information estimating unit 120 estimates the luminance information of the target skin based on the skin color information acquired by the skin color information acquiring unit 110 (step S102). Then, the controlling unit 130, based on the luminance information estimated by the luminance information estimating unit 120, controls the camera parameter relating to exposure when imaging the target (step S103).

Incidentally, after the control of the camera parameter by the controlling unit 130, the imaging of the target may be actually executed. That is, the target may be imaged by the camera 18 with the controlled camera parameter. In this case, the controlling unit 130 may have a function of outputting an imaging instruction to the camera after the control of the camera parameter. The image imaged by the camera 18 may be used, for example, for biometrics. In this case, the biometric authentication may be a multi-modal authentication for performing certification at a plurality of sites. For example, face authentication using a face image captured when acquiring skin color information and iris authentication using an iris image captured after control may be performed.

(Technical Effects)

Next, technical effects obtained by the information processing system 10 according to the first embodiment will be described.

As described referring to FIGS. 1 to 3, in the information processing system 10 according to the first embodiment, on the basis of the luminance information estimated from the skin color information of the target, the camera parameter relating to exposure at the time of imaging the target is controlled. In this way, it is possible to image the target under appropriate conditions. Therefore, it is possible to prevent white jumping or the like due to, for example, saturation of the pixel value. Further, in the present embodiment in particular, without actually imaging the target (i.e., by estimating the luminance information) since the camera parameters are controlled, while avoiding the delay of imaging, it is possible to capture an appropriate image.

Second Embodiment

An information processing system 10 according to a second embodiment will be described with reference to FIG. 4. Note that the second embodiment only differs in a part of configurations and operations from the first embodiment described above, and other portions may be the same as the first embodiment. Therefore, the portions that differ from the first embodiment described above will be described in detail below, and other overlapping portions will not be described as appropriate.

(Configuration of the controlling unit) A controlling unit 130 according to the second embodiment is configured to be able to control a illumination 19 when imaging the target on the basis of luminance information estimated by a luminance information estimating unit 120. Specifically, the controlling unit 130 may be configured to be able to control light amount and orientation of the illumination 19, or timing for causing light. Incidentally, when the illumination 19 is provided with a plurality, the controlling unit 130 may be configured to be able to control each of the plurality of illuminations 19. The controlling unit 130 should control the illumination 19 on the basis of the estimated luminance information so that the luminance information of the target is an appropriate value when the target is imaged by a camera 18. For example, the controlling unit 130 may control the illumination 19 so that the luminance information is reduced, when the estimated luminance information is too large (i.e., if too bright). For example, the controlling unit 130 may weaken the amount of light of the illumination 19, or deviate the orientation of the illumination 19 from the target, or control the timing for causing light so as to be different from the imaging timing. Alternatively, the controlling unit 130 may control the illumination 19 so that the luminance information is increased, if the estimated luminance information is too small (i.e., if too dark). For example, the controlling unit 130 may increase the amount of light of the illumination 19, or direct the illumination 19 to the target, or bring the timing for causing light closer to the imaging timing.

(Flow of Operation)

First, flow of operation by the information processing system 10 according to the second embodiment will be described referring to FIG. 4. FIG. 4 is a flowchart showing the flow of operation by the information processing system according to the second embodiment. Incidentally, in FIG. 4, the same reference numerals are given to the same processing as described in FIG. 3.

Figure 4:
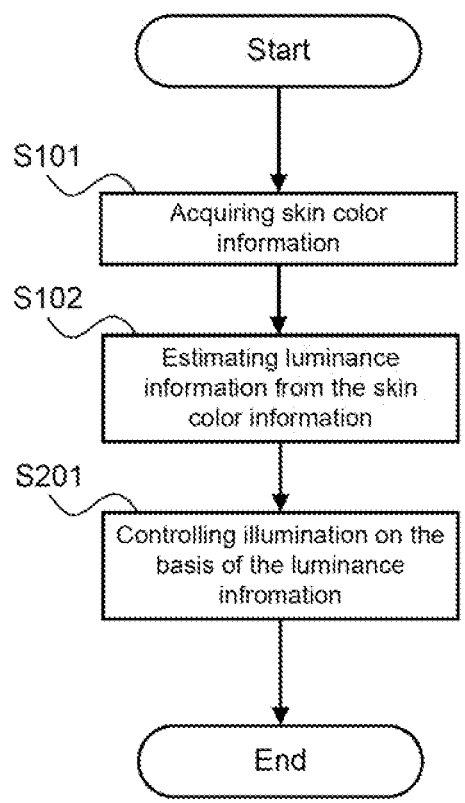
FIG. 4 is a flowchart showing flow of operation by an information processing system according to a second embodiment.

As shown in FIG. 4, when the information processing system 10 according to the second embodiment operates, first, a skin color information acquiring unit 110 acquires the skin color information of the target (step S101).

Subsequently, the luminance information estimating unit 120 estimates the luminance information of the skin of the target on the basis of the skin color information acquired by the skin color information acquiring unit 110 (step S102). Then, the controlling unit 130 controls the illumination 19 when imaging the target, on the basis of the luminance information estimated by the luminance information estimating unit 120 (step S201).

(Technical Effects)

Next, technical effects obtained by the information processing system 10 according to the second embodiment will be described.

As described referring to FIG. 4, in the information processing system 10 according to the second embodiment, the illumination 19 when imaging the target is controlled on the basis of the luminance information estimated from the skin color information of the target. In this way, it is possible to image the target under appropriate conditions. Therefore, it is possible to prevent overexposure or the like due to saturation of pixel values, for example. Further, in the present embodiment, in particular, since the illumination 19 is controlled without imaging the target actually (in other words, by estimating the luminance information), it is possible to avoid delay of imaging and to image appropriate images.

Third Embodiment

An information processing system 10 according to a third embodiment will be described with reference to FIG. 5. Incidentally, the third embodiment differs in a part of configurations and operations from the first and the second embodiments described above, the other portions may be the same as the first and the second embodiments. Therefore, the portions that differ from the embodiments described above are described in detail below, and the other overlapping portions are not described as appropriate.

(Configuration of Controlling Unit)

A controlling unit 130 according to the third embodiment is configured to be able to control a camera parameter relating to exposure and illumination 19 when imaging the target on the basis of a luminance information estimated by a luminance information estimating unit 120. That is, the controlling unit 130 according to the third embodiment is configured to be able to perform both of controlling the camera parameter described in the first embodiment and controlling the illumination 19 described in the second embodiment. The controlling unit 130 may perform controlling, in which shortfall caused by controlling one of the camera parameter and the illumination 19 is supplemented by controlling the other of the camera parameter and the illumination 19. Specifically, the controlling unit 130. For example, the controlling unit 130 may control the camera parameter so that the luminance information is reduced, and further control the illumination 19 so that the luminance information is reduced. Alternatively, the controlling unit 130 may perform controlling, in which excess caused by controlling one of the camera parameter and the illumination 19 is cancelled by controlling the other of the camera parameter and the illumination 19. For example, the controlling unit 130 may control the camera parameter so that the luminance information is reduced, and control the illumination 19 so that the luminance information is slightly larger.

(Flow of Operation)

First, referring to FIG. 5, flow of operation by the information processing system 10 according to the third embodiment will be described. FIG. 5 is a flowchart showing the flow of the operation by the information processing system according to the third embodiment. Incidentally, in FIG. 5, the same reference numerals are given to the same processing as shown in FIG. 3.

Figure 5:
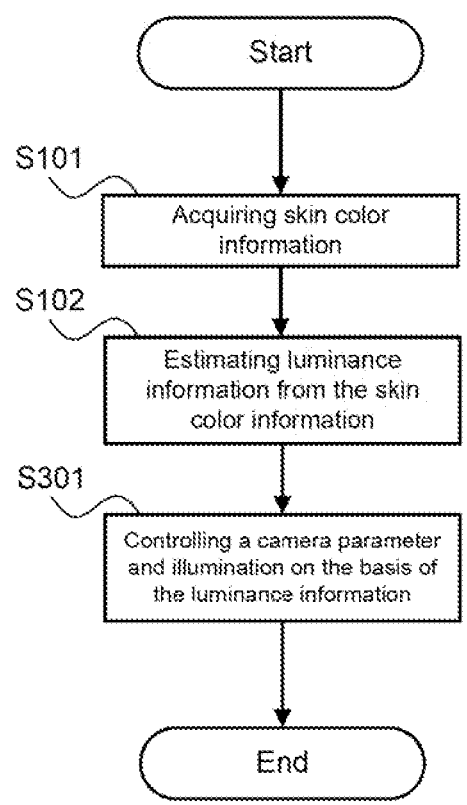
FIG. 5 is a flowchart showing flow of operation by an information processing system according to a third embodiment.

As shown in FIG. 5, when the information processing system 10 concerning the third embodiment operates, first, a skin color information acquiring unit 110 acquires a skin color information of the target (step S101).

Subsequently, a luminance information estimating unit 120 estimates luminance information of the skin of the target on the basis of the skin color information acquired by the skin color information acquiring unit 110 (step S102). Then, the controlling unit 130 controls the camera parameter and the illumination 19 when imaging the target on the basis of the luminance information estimated by the luminance information estimating unit 120 (step S301).
(Technical Effects)

Next, technical effects obtained by the information processing system 10 according to the third embodiment will be described.

As described referring to FIG. 5, in the information processing system 10 according to the third embodiment, the camera parameter and the illumination 19 when imaging the target is controlled on the basis of the luminance information estimated from the skin color information of the target. In this way, it is possible to image the target under appropriate conditions. Therefore, it is possible to prevent overexposure or the like due to saturation of pixel values, for example. Further, in the present embodiment, in particular, since the camera parameter and the illumination 19 is controlled without imaging the target actually (in other words, by estimating the luminance information), it is possible to avoid delay of imaging and to image appropriate images. Since both of the camera parameter and the illumination 19 are controlled, it is possible to perform controlling, degree of freedom of which is higher than controlling only one of the camera parameter and the illumination 19.

Fourth Embodiment

An information processing system 10 according to a fourth embodiment will be described with reference to FIGS. 6 and 7. Incidentally, the fourth embodiment only differs in a part of configurations and operations from the first to the third embodiments described above, the other portions may be the same as the first to the third embodiments. Therefore, the portions that differ from the embodiments described above are described in detail below, and the other overlapping portions are not described as appropriate.
(Functional Configuration)

First, referring to FIG. 6, functional configuration of the information processing system 10 according to the fourth embodiment will be described. FIG. 6 is a block diagram showing the functional configuration of the information processing system according to the fourth embodiment. Incidentally, in FIG. 6, it is denoted by the same reference numerals to the same elements as the components shown in FIG. 2.

Figure 6:
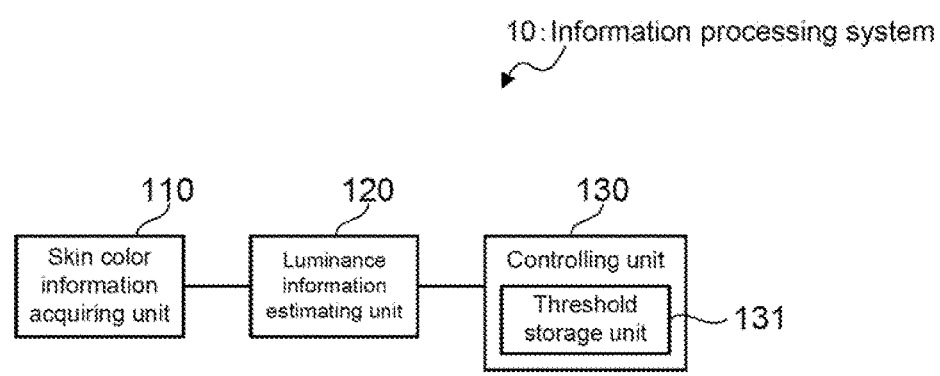
FIG. 6 is a block diagram showing a functional configuration of an information processing system according to a fourth embodiment.

As shown in FIG. 6, the information processing system 10 according to the fourth embodiment is configured to include a skin color information acquiring unit 110, a luminance information estimating unit 120, and a controlling unit 130 as components for realizing the functions. In particular, the controlling unit 130 according to the fourth embodiment includes a threshold storage unit 131.

The threshold storage unit 131 is configured to be able to store a first threshold value and a second threshold value used in controlling at least one of a camera parameter and an illumination 19. The first threshold value and the second threshold value are a threshold value indicating an upper limit of a target value of a luminance information and a threshold value indicating a lower limit of the target value of the luminance information, respectively. The controlling unit 130 according to the fourth embodiment is configured to be able to control at least one of the camera parameter and the illumination 19 so that the luminance information becomes between the first threshold value and the second threshold value. The first threshold value and the second threshold value may be values calculated by a simulation or the like in advance. For example, the first threshold value and the second threshold value may be set as values such that pixel values of an image of the target do not saturate. The first threshold value and the second threshold value may be prepared a plurality of sets. In this case, the first threshold value and the second threshold value actually used may be changed (selected) according to the skin color information and the luminance information of the target. For example, if the luminance information of the target is within a predetermined first range, a pair of a first threshold value A and a second threshold value A may be selected. If the luminance information of the target is within a predetermined second range, a pair of a first threshold value B and a second threshold value B may be selected. Alternatively, the first threshold value and the second threshold value may be values that can be set appropriately by a user (for example, values input by the user's operation). Alternatively, the first threshold value and the second threshold value may be values calculated appropriately on the basis of information about imaging environment and/or information about the target. In this case, the threshold storage unit 131 may be configured to have a function of calculating the first threshold value and the second threshold value.
(Flow of Operation)

Next, referring to FIG. 7, flow of operation by the information processing system 10 according to the fourth embodiment will be described. FIG. 7 is a flowchart showing the flow of the operation by the information processing system according to the fourth embodiment. Incidentally, in FIG. 7, the same reference numerals are given to the same processing as shown in FIG. 3.

Figure 7:
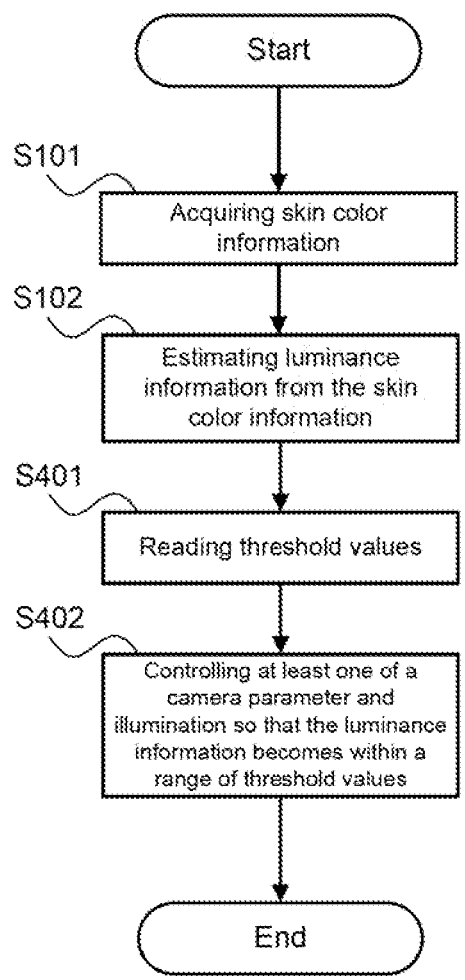
FIG. 7 is a flowchart showing flow of operation by the information processing system according to the fourth embodiment.

As shown in FIG. 7, when the information processing system 10 according to the fourth embodiment operates, first, the skin color information acquiring unit 110 acquires the skin color information of the target (step S101). Then, the luminance information estimating unit 120 estimates the luminance information of the skin of the target on the basis of the skin color information acquired by the skin color information acquiring unit 110 (step S102).

Subsequently, the controlling unit 130 reads the first threshold value and the second threshold value from the threshold storage unit 131 (step S401). Then, the controlling unit 130 controls at least one of the camera parameter and the illumination 19 when imaging the target so that the luminance information of the skin of the target becomes between the first threshold value and the second threshold value (step S402).
(Technical Effects)

Next, technical effects obtained by the information processing system 10 according to the fourth embodiment will be described.

As described referring to FIGS. 6 and 7, in the information processing system 10 according to the fourth embodiment, at least one of the camera parameter and the illumination 19 when imaging the target so that the luminance information of the skin of the target becomes between the first threshold value and the second threshold value. In this way, it is possible to more easily and accurately control at least one of the camera parameter and the illumination 19.

Fifth Embodiment

An information processing system 10 according to a fifth embodiment will be described with reference to FIGS. 8 and 9. Incidentally, the fifth embodiment only differs in a part of configurations and operations from the first to the fourth embodiments described above, the other portions may be the same as the first to the fourth embodiments. Therefore, the portions that differ from the embodiments described above are described in detail below, and the other overlapping portions are not described as appropriate.
(Functional Configuration)

First, a functional configuration of the information processing system 10 according to the fifth embodiment will be described with reference to FIG. 8. FIG. 8 is a block diagram showing the functional configuration of the information processing system according to the fifth embodiment. Incidentally, in FIG. 8, it is denoted by the same reference numerals to the same elements as the components shown in FIG. 2.

Figure 8:
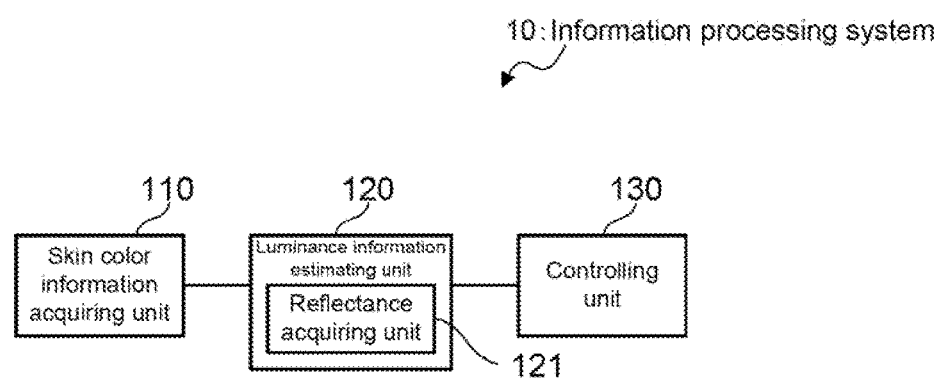
FIG. 8 is a block diagram showing a functional configuration of an information processing system according to a fifth embodiment.

As shown in FIG. 8, the information processing system 10 according to the fifth embodiment is configured to include a skin color information acquiring unit 110, a luminance information estimating unit 120, and a controlling unit 130 as components for realizing the functions. In particular, the luminance information estimating unit 120 according to the fifth embodiment includes a reflectance acquiring unit 121.

The reflectance acquisition unit 121 is configured to be able to acquire reflectance of skin corresponding to the skin color information acquired by the skin color information acquiring unit 110. The "reflectance of skin" here indicates a ratio of light irradiated to skin and light reflected from the skin. The reflectance of skin may be obtained for each wavelength of light to be irradiated, for example. Specifically, in addition to reflectance of skin of a visible light area, reflectance of skin of a near infrared area may be obtained. A more specific method of acquiring the reflectance of skin will be described in detail in other embodiments described later. Incidentally, the luminance information estimating unit 120 according to the fifth embodiment is configured to be able to estimate the luminance information of the skin of the target on the basis of the reflectance of skin acquired by the reflectance acquiring unit 121.
(Flow of Operation)

Next, referring to FIG. 9, flow of operation by the information processing system 10 according to the fifth embodiment will be described. FIG. 9 is a flowchart showing the flow of the operation by the information processing system according to the fifth embodiment. Incidentally, in FIG. 9, the same reference numerals are given to the same processing as shown in FIG. 3.

Figure 9:
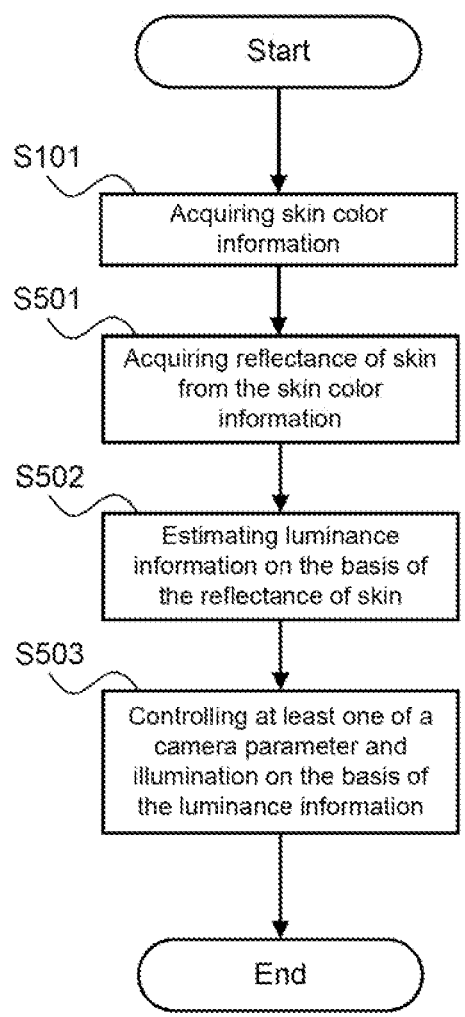
FIG. 9 is a flowchart showing flow of operation by the information processing system according to the fifth embodiment.

As shown in FIG. 9, when the information processing system 10 according to the fifth embodiment operates, first, the skin color information acquiring unit 110 acquires the skin color information of the target (step S101). Then, the reflectance acquisition unit 121 acquires the reflectance of skin of the target on the basis of the skin color information acquired by the skin color information acquiring unit 110 (step S501)

Subsequently, the luminance information estimating unit 120 estimates the luminance information of the skin of the target on the basis of the reflectance of skin acquired by the reflectance acquiring unit 121 (step S502). Then, the controlling unit 130 controls at least one of the camera parameter and the illumination 19 when imaging the target on the basis of the luminance information estimated by the luminance information estimating unit 120 (step S503).
(Technical Effects)

Next, technical effects obtained by the information processing system 10 according to the fifth embodiment will be described.

As described referring to FIGS. 8 and 9, in the information processing system 10 according to the fifth embodiment, the luminance information of the skin of the target is estimated on the basis of the reflectance of skin. In this way, it is possible to accurately estimate the luminance information of the skin of the target. Thus, it is possible to more appropriately control at least one of the camera parameter and the illumination 19.

Sixth Embodiment

An information processing system 10 according to a sixth embodiment will be described with reference to FIGS. 10 to 12. Incidentally, the sixth embodiment only differs in a part of configurations and operations from the fifth embodiment described above, the other portions may be the same as the first to the fifth embodiments. Therefore, the portions that differ from the embodiments described above are described in detail below, and the other overlapping portions are not described as appropriate.
(Functional Configuration)

First, a functional configuration of the information processing system 10 according to the sixth embodiment will be described with reference to FIG. 10. FIG. 10 is a block diagram showing the functional configuration of the information processing system according to the sixth embodiment. Incidentally, in FIG. 10, it is denoted by the same reference numerals to the same elements as the components shown in FIG. 8.

Figure 10:
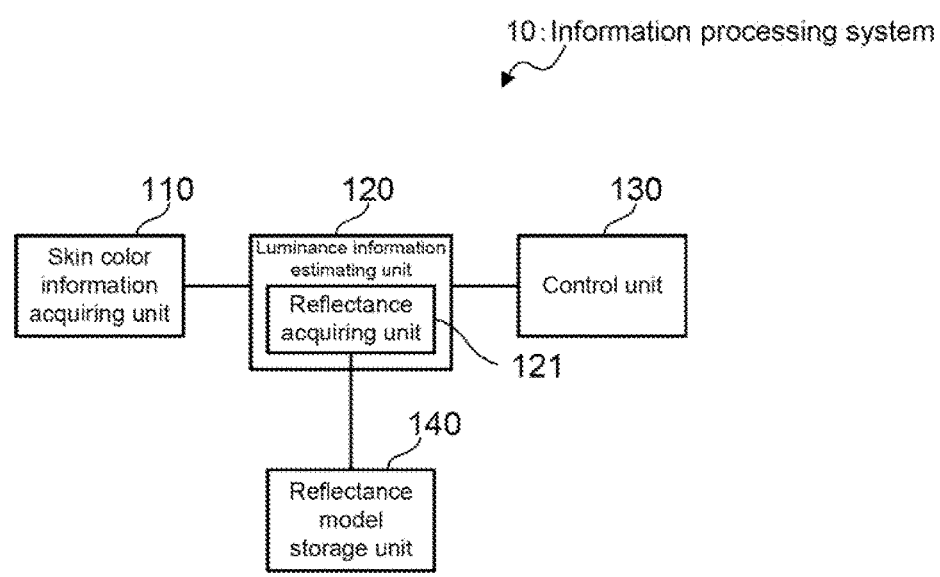
FIG. 10 is a block diagram showing a functional configuration of an information processing system according to a sixth embodiment.

As shown in FIG. 10, the information processing system 10 according to the sixth embodiment is configured to comprise a skin color information acquiring unit 110, a luminance information estimating unit 120, a controlling unit 130, and a reflectance model storage unit 140 as components for realizing the functions. That is, the information processing system 10 according to the sixth embodiment further comprises the reflectance model storage unit 140 in addition to the configuration of the fifth embodiment (see FIG. 8). The reflectance model storage unit 140 may be implemented, for example, by the above-described storage apparatus 14 (see FIG. 1).

The reflectance model storage unit 140 is configured to be able to store a reflectance model for calculating reflectance of skin from skin color information acquired by the skin color information acquiring unit 110. The reflectance model may be generated on the basis of data acquired from a plurality of living bodies in advance. The reflectance model may also be a model generated by machine learning. Specific examples of the reflectance model will be described in detail later. Incidentally, the reflectance acquiring unit 121 according to the sixth embodiment is configured to be able to calculate the reflectance of skin using the reflectance model read from the reflectance model storage unit 140.
(Flow of Operation)

Next, referring to FIG. 11, flow of operation by the information processing system 10 according to the sixth embodiment will be described. FIG. 11 is a flowchart showing the flow of the operation by the information processing system according to the sixth embodiment. Incidentally, in FIG. 11, the same reference numerals are given to the same processing as shown in FIG. 9.

Figure 11:
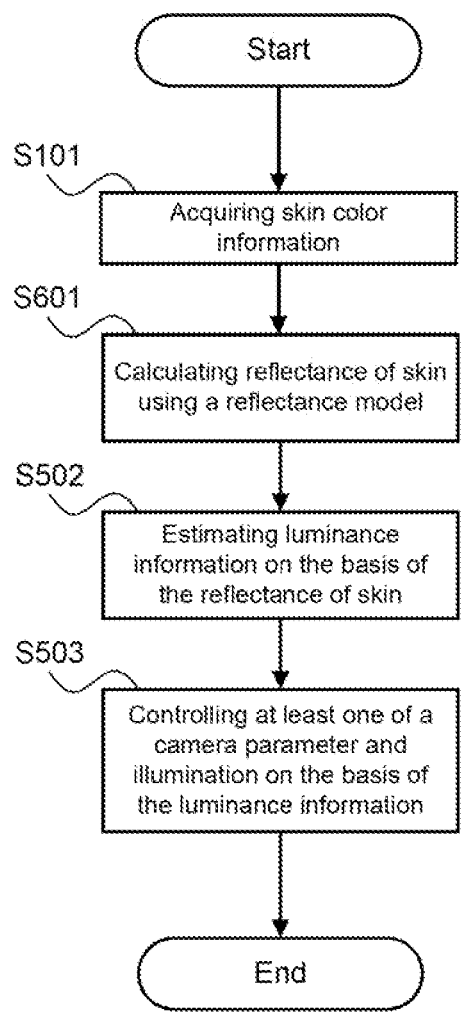
FIG. 11 is a flowchart showing flow of operation by the information processing system according to the sixth embodiment.

As shown in FIG. 11, when the information processing system 10 according to the sixth embodiment operates, first, the skin color information acquiring unit 110 acquires the skin color information of the target (step S101). Then, reflectance acquiring unit 121 calculates the reflectance of skin of the target using the reflectance model stored in the reflectance model storage unit 140 (step S601). That is, the reflectance acquiring unit 121 calculates the reflectance of skin of the target on the basis of the skin color information and the reflectance model.

Subsequently, the luminance information estimating unit 120 estimates the luminance information of the skin of the target on the basis of the reflectance of skin calculated by the reflectance acquiring unit 121 (step S502). Then, the controlling unit 130 controls at least one of the camera parameter and the illumination 19 when imaging the target on the basis of the luminance information estimated by the luminance information estimating unit 120 (step S503).

Calculation Example of Reflectance

Figure 12:
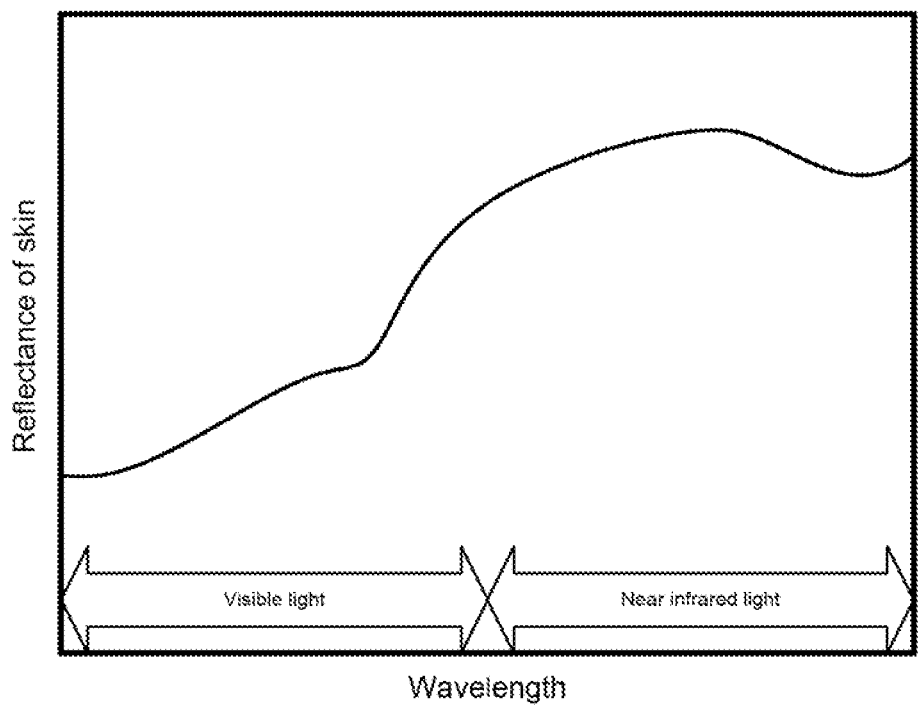
FIG. 12 is a graph showing an example of reflectance of skin calculated by the information processing system according to the sixth embodiment.

Next, referring to FIG. 12, a calculation example of the reflectance of skin by the information processing system 10 according to the sixth embodiment (i.e., calculation example using the reflectance model) will be specifically described. FIG. 12 is a graph showing an example of the reflectance of skin calculated by the information processing system according to the sixth embodiment. Incidentally, the vertical axis of the graph shown in FIG. 12 "reflectance of skin", the horizontal axis is "wavelength (of light)".

First, it is assumed that the skin color information acquiring unit 110 acquires an average RGB value from a face image (visible light image) of the target as the skin color information. If gamma correction is applied to an RGB value, an RGB value when y=1.0 may be calculated by a degamma processing.

The reflectance acquiring unit 121 calculates the tristimulus value XYZ from the above-described RGB value. The tristimulus value XYZ can be calculated using the following equation (1), for example.

[Equation 1]
$$\begin{bmatrix} X \\ Y \\ Z \end{bmatrix} = \begin{bmatrix} a11 & a12 & a13 \\ a21 & a22 & a23 \\ a31 & a32 & a33 \end{bmatrix} \begin{bmatrix} R \\ G \\ B \end{bmatrix} \quad (1)$$

Note that the transformation matrix aij may use a matrix defined in the standard RGB-space sRGB.

Subsequently, the reflectance acquiring unit 121 estimates the reflectance of skin S(λ) from the calculated tristimulus value XYZ. Specifically, characteristic parameters (a, b, c) is calculated by using the following equation (2).

[Equation 2]
$$\begin{bmatrix} X \\ Y \\ Z \end{bmatrix} = k \begin{bmatrix} \sum s1(\lambda)x(\lambda)d65(\lambda) & \sum s1(\lambda)x(\lambda)d65(\lambda) & \sum s1(\lambda)x(\lambda)d65(\lambda) \\ \sum s1(\lambda)y(\lambda)d65(\lambda) & \sum s1(\lambda)y(\lambda)d65(\lambda) & \sum s1(\lambda)y(\lambda)d65(\lambda) \\ \sum s1(\lambda)z(\lambda)d65(\lambda) & \sum s1(\lambda)z(\lambda)d65(\lambda) & \sum s1(\lambda)z(\lambda)d65(\lambda) \end{bmatrix} \begin{bmatrix} a \\ b \\ c \end{bmatrix} + \quad (2)$$

$$\begin{bmatrix} \sum s0(\lambda)x(\lambda)d65(\lambda) \\ \sum s0(\lambda)x(\lambda)d65(\lambda) \\ \sum s0(\lambda)x(\lambda)d65(\lambda) \end{bmatrix}$$

Wherein, in the above equation (2), si(λ) is a basis vector (i=1 to 3), s0(λ) is an average vector, x (λ), y (λ), z (λ) are isochromatic functions, d65(λ) is spectral distribution of standard white D65, respectively known information.

Subsequently, the reflectance acquiring unit 121 determines the reflectance of skin by substituting the calculated characteristic parameters (a, b, c) into the reflectance model. Specifically, by substituting the characteristic parameters (a, b, c) into the following equation (3), the reflectivity S(λ) is determined. The reflectance of skin S(λ), as shown in FIG. 12, may be obtained from the visible light area to the near-infrared light area.

(Technical Effects)

Next, technical effects obtained by the information processing system 10 according to the sixth embodiment will be described.

As described referring to FIGS. 10 to 12, in the information processing system 10 according to the sixth embodiment, the reflectance of skin of the target is calculated by using the reflectance model. In this way, it is possible to calculate the reflectance of skin easily and accurately. Therefore, it is possible to accurately estimate the luminance information of the skin, thereby it is possible to more appropriately control at least one of the camera parameter and illumination 19. In particular, in the information processing system 10 according to the sixth embodiment, when a camera images a face with visible light, and a camera images an iris with near-infrared light in a multi-modal authentication by the face and the iris, it is possible to obtain luminance information of skin in a near-infrared area from luminance information obtained from a face image imaged with visible light, then, it is possible to appropriately control at least one of a camera parameter and an illumination for the camera imaging the iris on the basis of the luminance information in the near-infrared area.

Seventh Embodiment

An information processing system 10 according to a seventh embodiment will be described with reference to FIGS. 13 and 14. Incidentally, the seventh embodiment only differs in a part of configurations and operations from the first to the sixth embodiments described above, the other portions may be the same as the first to sixth embodiments. Therefore, the portions that differ from the embodiments described above are described in detail below, and the other overlapping portions are not described as appropriate.

(Functional Configuration)

First, a functional configuration of the information processing system 10 according to the seventh embodiment will be described with reference to FIG. 13. FIG. 13 is a block diagram illustrating the functional configuration of the information processing system according to the seventh embodiment. Incidentally, in FIG. 13, it is denoted by the same reference numerals to the same elements as the components shown in FIG. 2.

Figure 13:
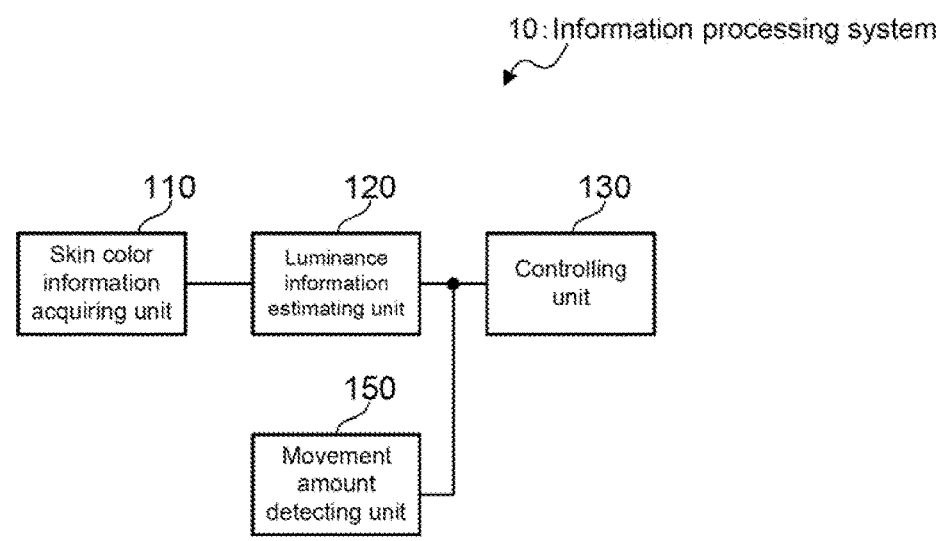
FIG. 13 is a block diagram showing a functional configuration of an information processing system according to a seventh embodiment.

As shown in FIG. 13, the information processing system 10 according to the seventh embodiment is configured to include a skin color information acquiring unit 110, a luminance information estimating unit 120, a controlling unit 130, and a movement amount detecting unit 150 as components for realizing the functions. That is, the information processing system 10 according to the seventh embodiment further includes a movement amount detecting unit 150 in addition to the configuration of the first embodiment (see FIG. 2).

The movement amount detecting unit 150 is configured to be able to detect movement amount of the target. More specifically, the movement amount detecting unit 150 may be configured to detect movement amount per unit time of the target (in other words, movement velocity). The movement amount detecting unit 150 may be configured to detect the movement amount of the target using various sensors. Alternatively, the movement amount detecting unit 150 may image a plurality of images of the target, and may detect the movement amount of the target on the basis of difference among the plurality of images (specifically, changing of a position of the target in the plurality of images). It is configured to output the movement amount of the target detected by the movement amount detecting unit 150 to the controlling unit 130.

The controlling unit 130 according to the seventh embodiment is configured to be able to control at least one of a camera parameter and an illumination 19 on the basis of the movement amount detected by the movement amount detecting unit 150 in addition to a luminance information estimated by the luminance information estimating unit 120. The controlling unit 130, for example, may change control amount in accordance with the detected movement amount of the target. That is, the controlling unit 130 may increase or reduce the control amount of the camera parameter and/or the illumination 19 in accordance with magnitude of the movement amount of the target. Further, the controlling unit 130 may change a type of a parameter to be controlled in accordance with the detected movement amount of the target. For example, when the movement amount of the target is large, since it is not preferable to increase a shutter speed (exposure time) (there is a risk of blurring), the controlling unit 130 may control other parameters. Further, when the movement amount of the target is large, the controlling unit 130 may control so that a shutter speed become shorter, and light amount of the illumination 19 increases. Further, when the movement amount of the target is small, the controlling unit 130 may control so that a shutter speed become longer, and light amount of the illumination 19 decreases.

(Flow of Operation)

Next, referring to FIG. 14, flow of operation by the information processing system 10 according to the seventh embodiment will be described. FIG. 14 is a flowchart showing the flow of the operation by the information processing system according to the seventh embodiment. Incidentally, in FIG. 14, the same reference numerals are given to the same processing as shown in FIG. 3.

Figure 14:
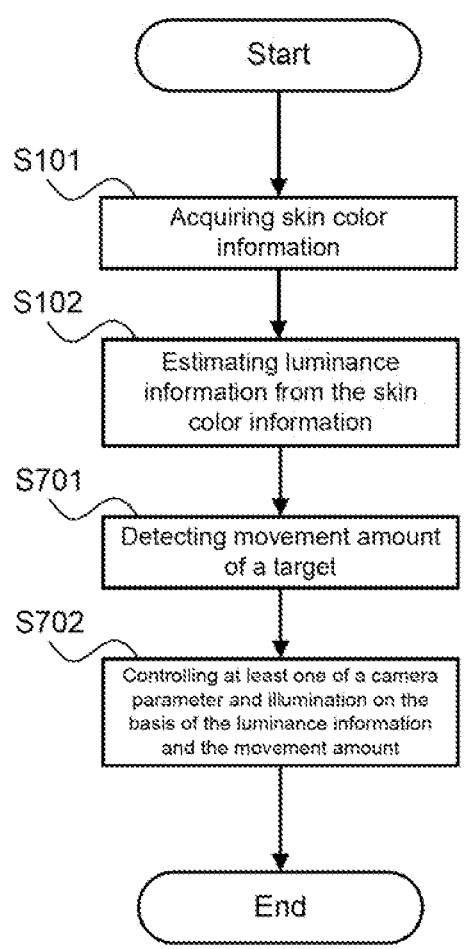
FIG. 14 is a flowchart showing flow of operation by the information processing system according to the seventh embodiment.

As shown in FIG. 14, when the information processing system 10 according to the seventh embodiment operates, first, the skin color information acquiring unit 110 acquires the target skin color information (step S101). Then, the luminance information estimating unit 120 estimates the luminance information of the skin of the target on the basis of the skin color information acquired by the skin color information acquiring unit 110 (step S102).

Subsequently, the movement amount detecting unit 150 detects the movement amount of the target (step S701). Incidentally, detecting the movement amount may be executed before and after steps S101 and S102 described above, may be executed in parallel at the same time.

Thereafter, the controlling unit 130 controls at least one of the camera parameter and the illumination 19 when imaging the target on the basis of the luminance information estimated by the luminance information estimating unit 120, and the movement amount detected by the movement amount detecting unit 150 (step S702).

(Technical Effects)

Next, technical effects obtained by the information processing system 10 according to the seventh embodiment will be described.

As described referring to FIGS. 13 and 14, in the information processing system 10 according to the seventh embodiment, at least one of the camera parameter and the illumination 19 when imaging the target is controlled in consideration of the movement amount of the target. In this way, it is possible to more appropriately control at least one of the camera parameter and the illumination 19 as compared with the case where the movement amount of the target is not considered.

Eighth Embodiment

An information processing system 10 according to an eighth embodiment will be described with reference to FIG. 15. Note that the eighth embodiment differs only in a part of operations from the first to the seventh embodiments described above, and the other portions may be the same as those of the first to the seventh embodiments. Therefore, the portions that differ from the embodiments described above are described in detail below, and the other overlapping portions are not described as appropriate.

(Flow of Operation)

First, referring to FIG. 15, flow of operation by the information processing system 10 according to the eighth embodiment will be described. FIG. 15 is a flowchart showing the flow of the operation by the information processing system according to the eighth embodiment. Incidentally, in FIG. 15, the same reference numerals are given to the same processing as shown in FIG. 3.

Figure 15:
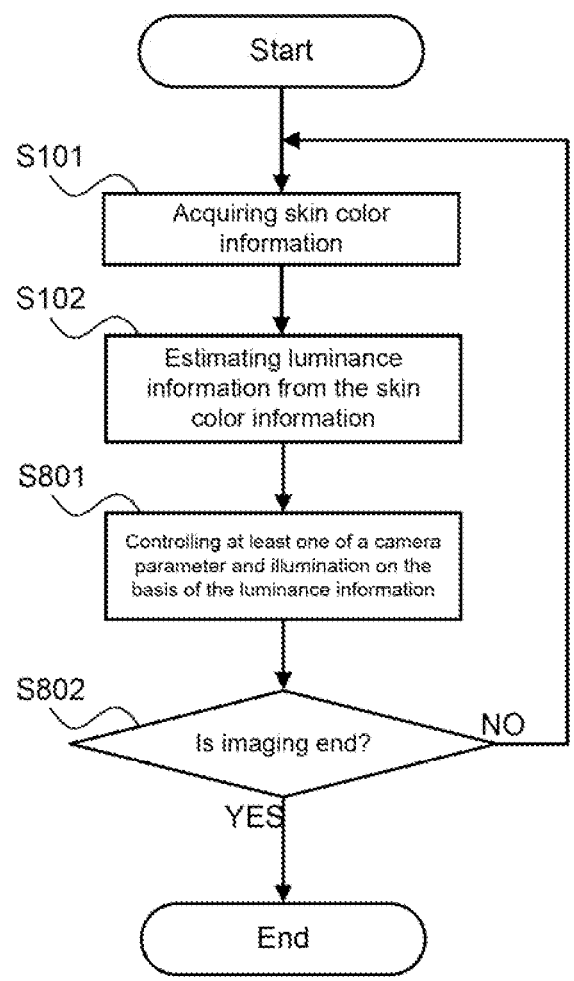
FIG. 15 is a flowchart showing flow of operation by an information processing system according to an eighth embodiment.

As shown in FIG. 15, when the information processing system 10 according to the eighth embodiment operates, first, a skin color information acquiring unit 110 acquires a skin color information of a target (step S101). Then, a luminance information estimating unit 120 estimates luminance information of the skin of the target on the basis of the skin color information acquired by the skin color information acquiring unit 110 (step S102).

Subsequently, the controlling unit 130 controls at least one of a camera parameter and an illumination 19 when imaging the target on the basis of the luminance information estimated by the luminance information estimating unit 120 (step S801). In the information processing system according to the present embodiment, in particular, it is determined that whether or not all imaging, which is performed after the control executed in the step S801, is ended (step S802). That is, it is determined that whether imaging the current target is ended or imaging the current target is continued. Determining whether or not imaging the target may be determined by the number of images imaged so far (e.g., whether or not the number of imaging reaches a predetermined number), and/or by a position of the target (e.g., whether or not the target moves to outside of an imaging range).

When it is determined that imaging the target is ended (step S802: YES), a series of this operation is ended. On the other hand, when it is determined that imaging the target is not ended (step S802: NO), processing is started from the step S101 again. Thus, in the case of imaging a plurality of images of the target, at least one of the camera parameter and the illumination 19 is to be controlled every time an image is imaged. For example, if the target is moving closer to a camera 18, the controlling unit 130 may control so that a shutter speed become shorter as the target approaches the camera 18. Further, in such a case, the controlling unit 130 may control so that the illumination 19 becomes gradually brighter in order to reduce influence of the shutter speed being shorter.

(Technical Effects)

Next, technical effects obtained by the information processing system 10 according to the eighth embodiment will be described.

As described referring to FIG. 15, in the information processing system 10 according to the eighth embodiment, at least one of the camera parameter and the illumination 19 is controlled for each imaging. In this way, since the control is performed at any time according to a situation, it is possible to image the target in a more appropriate condition.

Ninth Embodiment

An information processing system 10 according to a ninth embodiment will be described with reference to FIG. 16. Note that the ninth embodiment describes a specific example of the control operation of the eighth embodiment described above, and the other portions may be the same as those of the first to the seventh embodiments. Therefore, the portions that differ from the embodiments described above are described in detail below, and the other overlapping portions are not described as appropriate.

Control Operation Example

First, referring to FIG. 16, a specific example of a control operation (i.e., control of a camera parameter and an illumination) by the information processing system 10 according to the ninth embodiment will be described. FIG. 16 is a table showing an example of a control operation by the information processing system according to the ninth embodiment.

As shown in FIG. 16, in the information system 10 according to the ninth embodiment, a controlling unit 130 controls exposure time of a camera 18 (shutter speed) and an illumination 19 on the basis of luminance information estimated by a luminance information estimating unit 120. Specifically, the controlling unit 130 according to the ninth embodiment can perform a first control, in which the exposure time becomes shorter, and the illumination 19 becomes brighter, and a second control, in which the exposure time becomes longer, and the illumination 19 becomes darker. In the first control, brightness of the illumination 19 may be controlled so that an image is not too dark in consideration of influence on the image by shortening the exposure time. In the second control, the brightness of the illumination 19 may be controlled so that an image is not too bright in consideration of influence on the image by prolonging the exposure time. Incidentally, the brightness of the illumination 19 may be controlled by adjusting an orientation and light timing of the illumination 19 as described in other embodiments described above in addition to adjusting amount of light.

The first control and the second control are performed for each imaging. Therefore, when the first control is performed for each imaging, it is controlled so that the exposure time gradually becomes shorter, and the illumination 19 gradually becomes brighter as imaging progresses. Further, when the second control is performed for each imaging, it is controlled so that the exposure time gradually becomes longer, and the illumination 19 gradually becomes darker as imaging progresses. Incidentally, either to perform the first control and the second control may be changed in the middle of imaging. For example, the second control may be performed after the first control is performed. Further, the first control may be performed after the second control is performed. Timing for switching the first control and the second control may be determined by, for example, luminance information estimated by the information estimating unit 120.

(Technical Effects)

Next, technical effects obtained by the information processing system 10 according to the ninth embodiment will be described.

As described referring to FIG. 16, in the information processing system 10 according to the ninth embodiment, the exposure time of the camera 18 and the brightness of the illumination 19 are controlled on the basis of the luminance information. In this way, since the coordinated control for the camera parameter and the illumination 19 will be performed, it is possible to image the target in a more appropriate condition.

A program for operating the configuration of the embodiments to realize the functions of the embodiments described above is recorded on a recording medium, a program recorded on the recording medium is read as a code, and a processing method that is executed in a computer is also included in the scope of the embodiments. That is, a computer-readable recording medium is also included in range of the respective embodiments. In addition, not only the recording medium on which the above-described program is recorded, but also the program itself is included in each embodiment.

For example, a floppy (registered trademark) disk, a hard disk, an optical disk, a magnetic-optical disk, a CD-ROM, a magnetic tape, a non-volatile memory card, or a ROM can be used as a recording medium. In addition, not only the program recorded on the recording medium itself is executed by processing, but also the program that operates on the operating system and executes processing in collaboration with other software and expansion board functions is included in the scope of the respective embodiments. Further, the program itself may be stored in a server so that some or all of the programs can be downloaded from the server to the user terminal.

<Supplementary Notes>

With respect to the embodiments described above, it may be further described as supplementary notes below, but is not limited to the following.

(Supplementary Note 1)

An information processing system described in a supplementary note 1 is an information processing system comprising: an acquiring means for acquiring skin color information which is information relating to skin color of a target; an estimating means for estimating luminance information of skin of the target on the basis of the skin color information; and a control means for controlling at least one of camera parameter relating to exposure and illumination when imaging the target on the basis of the luminance information.

(Supplementary note 2)

An information processing system described in a supplementary note 2 is the information processing system according to the supplementary note 1, wherein the control means controls at least one of the camera parameter and the illumination so that luminance information of the skin of the target is between a first threshold and a second threshold.

(Supplementary note 3)

An information processing system described in a supplementary note 3 is the information processing system according to the supplementary note 1 or 2, wherein the estimating means estimates the luminance information on the bases of reflectance of the skin of the target in accordance with the skin color information.

(Supplementary note 4)

An information processing system described in a supplementary note 4 is the information processing system according to the supplementary note 3, wherein the information processing system further comprises a storage means for storing a reflectance model for calculating a reflectance of the skin from the skin color information, and the estimation means estimates the luminance information on the basis of the reflectance of the skin calculated by using the reflectance model.

(Supplementary note 5)

An information processing system described in a supplementary note 5 is the information processing system according to any one of supplementary notes 1 to 4, wherein the information processing system further comprises a detecting means for detecting a movement amount of the target, and the control means controls at least one of the camera parameter and the illumination on the basis of the luminance information and the movement amount.

(Supplementary note 6)

An information processing system described in a supplementary note 6 is the information processing system according to any one of supplementary notes 1 to 5, wherein when the target is imaged a plurality of times, the control means controls at least one of the camera parameter and the illumination for each imaging.

(Supplementary note 7)

An information processing system described in a supplementary note 7 is the information processing system according to the supplementary note 6, wherein the control means performs a first control, in which an exposure time is shortened and the illumination is brightened for each imaging when the target is imaged, or a second control, in which the exposure time is prolonged and the illumination is darkened for each imaging when the target is imaged, on the basis of the luminance information.

(Supplementary note 8)

An information processing apparatus described in a supplementary note 8 is an information processing apparatus comprising: an acquiring means for acquiring skin color information which is information relating to skin color of a target; an estimating means for estimating luminance information of skin of the target on the basis of the skin color information; and a controlling means for controlling at least one of camera parameter relating to exposure and illumination when imaging the target on the basis of the luminance information.

(Supplementary note 9)

An information processing method described in a supplementary note 9 is an information processing method executed by at least one computer, the information processing method comprising: acquiring skin color information which is information relating to a skin color of a target, estimating luminance information of the skin of the target on the basis of the skin color information, and controlling at least one of a camera parameter relating to exposure and illumination when imaging the target on the basis of the luminance information.

(Supplementary note 10)

A recording medium described in a supplementary note 10 is a recording medium in which a computer program for causing at least one computer to execute an information processing method, the information processing method comprising: acquiring skin color information which is information relating to skin color of a target, estimating luminance information of skin of the target on the basis of the skin color information, and controlling at least one of a camera parameter relating to exposure and illumination when imaging the target on the basis of the luminance information, is recorded.

(Supplementary note 11)

A computer program described in a supplementary note 11 is a computer program for causing at least one computer to execute an information processing method, the information processing method comprising: acquiring skin color information which is information relating to skin color of a target, estimating luminance information of skin of the target on the basis of the skin color information, and controlling at least one of a camera parameter relating to exposure and illumination when imaging the target on the basis of the luminance information.

This disclosure can be changed as appropriate in range not contrary to the summary or idea of the invention that can be read from range of the request and the entire statement. Information processing systems, information processing apparatus, information processing methods, and recording media with such changes are also included in the technical concept of this disclosure.

DESCRIPTION OF REFERENCE NUMERALS AND LETTERS

10 Information processing system
11 Processor
18 Camera
19 Illumination
110 Skin color information acquiring unit
120 Luminance information estimating unit
121 Reflectance acquiring unit
130 Controlling unit
131 Threshold storage unit
140 Reflectance model storage unit
150 Movement amount detecting unit

What is claimed is:

1. An information processing system comprising:
at least one memory storing instructions; and
at least one processor configured to execute the instructions to:
acquire skin color information relating to skin color of a target;
store a reflectance model for calculating reflectance of skin of the target from the estimate luminance information of the skin of the target based on the skin color information, based on the reflectance of the skin of the target calculated by using the reflectance model; and
control at least one of camera parameter relating to exposure and illumination when imaging the target on the basis of the luminance information.

2. The information processing system according to claim 1, wherein the at least one processor is configured to execute the instructions to control the at least one of the camera parameter and the illumination so that the luminance information of the skin of the target is between a first threshold and a second threshold.

3. The information processing system according to claim 2, wherein the at least one processor is configured to execute the instructions to:
   detect a movement amount of the target; and
   control the at least one of the camera parameter and the illumination based on the luminance information and the movement amount.

4. The information processing system according to claim 2, wherein when the target is imaged a plurality of times, and the at least one processor is configured to execute the instructions to control the at least one of the camera parameter and the illumination each time the target is imaged.

5. The information processing system according to claim 1, wherein the at least one processor is configured to execute the instructions to:
   detect a movement amount of the target; and
   control the at least one of the camera parameter and the illumination based on the luminance information and the movement amount.

6. The information processing system according to claim 5, wherein when the target is imaged a plurality of times, and the at least one processor is configured to execute the instructions to control the at least one of the camera parameter and the illumination each time the target is imaged.

7. The information processing system according to claim 1, wherein when the target is imaged a plurality of times, and the at least one processor is configured to execute the instructions to control the at least one of the camera parameter and the illumination each time the target is imaged.

8. The information processing system according to claim 7, wherein the at least one processor is configured to execute the instructions to perform a first control, in which an exposure time is shortened and the illumination is brightened, each time the target is imaged, or a second control, in which the exposure time is lengthened and the illumination is darkened, each time the target is imaged, based on the luminance information.

9. The information processing system according to claim 1, wherein when the target is imaged a plurality of times, and the at least one processor is configured to execute the instructions to control the at least one of the camera parameter and the illumination each time the target is imaged.

10. An information processing apparatus comprising:
    at least one memory storing instructions; and
    at least one processor configured to execute the instructions to:
      store a reflectance model for calculating reflectance of skin of the target from the estimate luminance information of the skin of the target based on the skin color information, based on the reflectance of the skin of the target calculated by using the reflectance model; and
      control at least one of camera parameter relating to exposure and illumination when imaging the target on the basis of the luminance information.

11. An information processing method performed by at least one computer and comprising:
    acquiring skin color information relating to skin color of a target;
    storing a reflectance model for calculating reflectance of skin of the target from the estimating luminance information of the skin of the target based on the skin color information, based on the reflectance of the skin of the target calculated by using the reflectance model; and
    controlling at least one of camera parameter relating to exposure and illumination when imaging the target on the basis of the luminance information.

* * * * *